Figure 1:
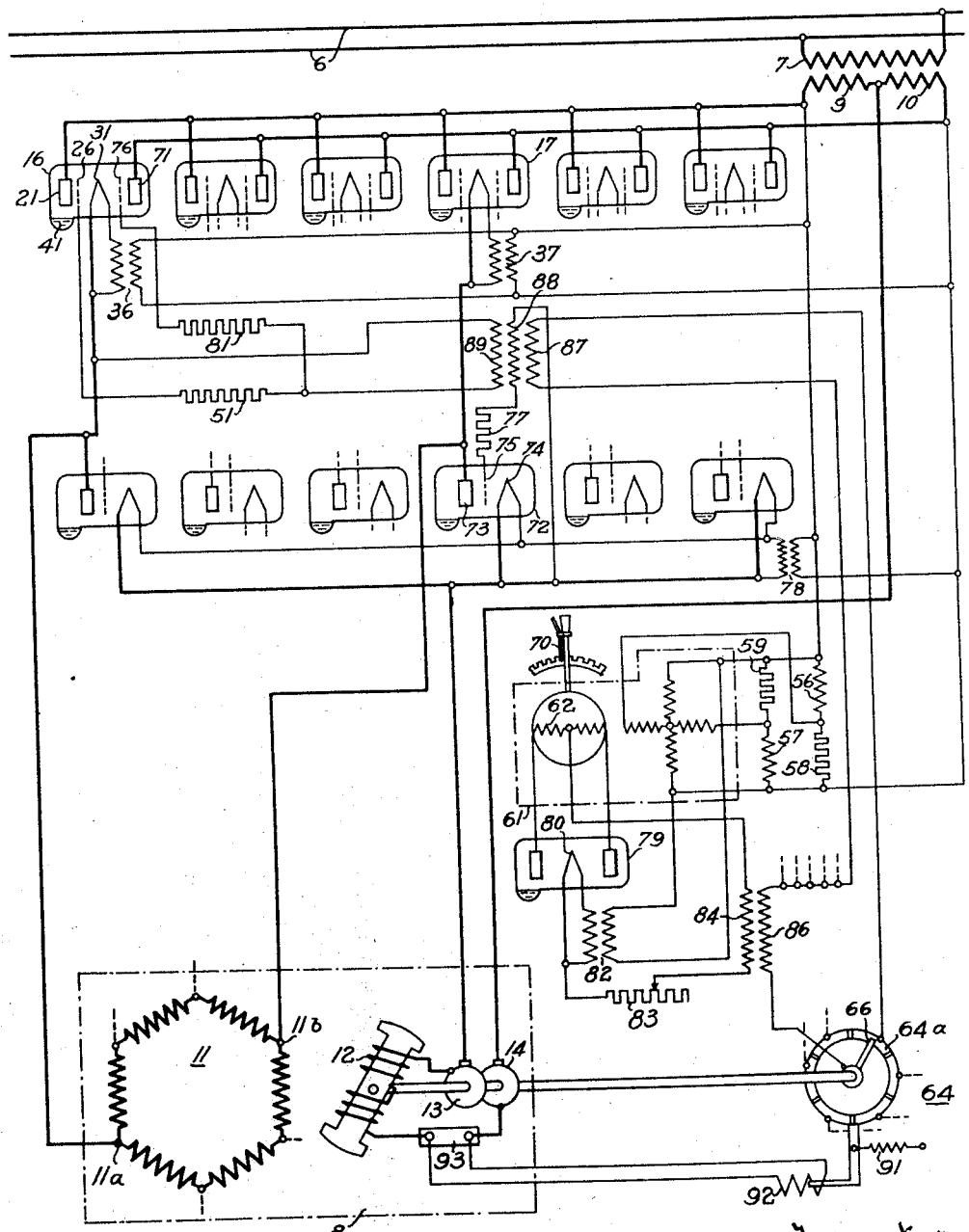

Feb. 11, 1941.  D. JOURNEAUX  2,231,271
MOTOR CONTROL SYSTEM
Original Filed Feb. 3, 1933  2 Sheets-Sheet 1

Inventor
D. Journeaux
by
Attorney

Patented Feb. 11, 1941

2,231,271

UNITED STATES PATENT OFFICE 2,231,271

MOTOR CONTROL SYSTEM

Didier Journeaux, Wauwatosa, Wis., assignor to Allis-Chalmers Manufacturing Company, Milwaukee, Wis., a corporation of Delaware Original application February 3, 1933, Serial No. 655,015. Divided and this application February 1, 1939, Serial No. 253,988

21 Claims. (Cl. 172—274)

This invention relates to improvements in electric control systems and more particularly to the control of variable speed alternating current motors in which the armature currents are conducted by means of electron discharge devices.

It is well known that an alternating current motor of the so-called synchronous type may be operated at gradually variable speeds by effecting the commutation of the armature currents thereof by means of electron discharge devices provided with control electrodes. In systems of such character known heretofore, the motor armature was preferably connected in polygon and provided with a number of connection points, there being one electron discharge device for each connection point if the armature was to be short circuited or four such devices if the armature was to be conductively energized from the supply line. The cathodes of the several electron discharge devices employed in such a system are generally not all at the same potential and, as each control electrode must be energized at a potential considered relative to the potential of the associated cathode, the energization of such control electrodes by means of direct current sources such as batteries was necessarily complicated. The energization of the control electrodes also required the use of a plurality of single pole distributor switches or of at least one double pole distributor switch.

By energizing the control electrodes with alternating current, the use of additional sources is avoided as the control currents may be obtained from the supply line. The energization of the control electrodes may then be effected over a single distributor switch of the single pole type thereby controlling the operation of the electron discharge devices connecting the motor armature with both conductors of the line. The motor current obtained from the line may be converted into pulsating direct current by suitable connection of the motor with the supply transformer which permits the number of discharge devices to be reduced. The energization of the control electrodes of such devices is then preferably effected at a frequency which is a multiple of the supply line frequency. Such control permits regulation of the energization of the motor at any desired voltage within the limits permitted by the supply transformer therefor and the motor may be connected through such supply transformer without the interposition of switching devices, the motor then being started, reversed, and regulated by the control of the discharge devices.

It is therefore among the objects of the present invention to provide a control system for variable speed alternating current motors in which the motor armature currents are controlled by means of electron discharge devices.

Another object of the present invention is to provide a control system for variable speed alternating current motors whereby such motors may be brought to operating speed without using switching devices.

Another object of the present invention is to provide a control system for variable speed alternating current motors whereby the direction of rotation of the motors may be reversed without using switching devices.

Another object of the present invention is to provide a control system for variable speed alternating current motors employing electron discharge devices provided with control electrodes energized with alternating current voltages.

Another object of the present invention is to provide a control system for variable speed alternating current motors employing electron discharge devices provided with control electrodes energized an integral number of times during each cycle of the supply line voltage.

Another object of the present invention is to provide a control system for variable speed alternating current motors employing electron discharge devices provided with control electrodes energized with pulsating direct current.

Another object of the present invention is to provide a control system for variable speed alternating current motors employing electron discharge devices provided with control electrodes energized through a single distributor switch of the single pole type.

Figure 2:
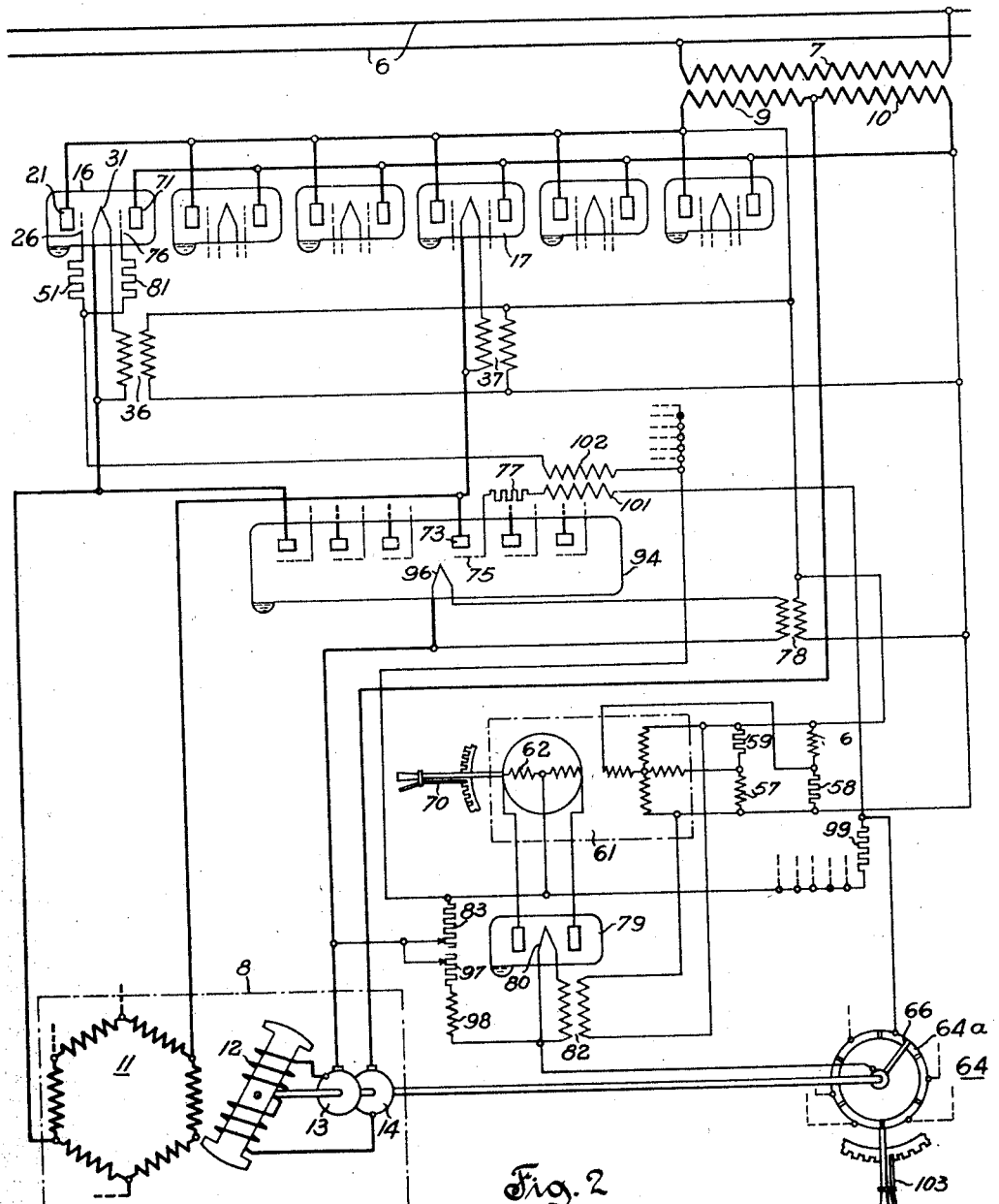

Objects and advantages other than those above set forth will be apparent from the following description when read in connection with the accompanying drawings, in which:

Fig. 1 diagrammatically illustrates one embodiment of the present invention applied to the control of a single phase alternating current motor of the series type whereby the motor receives pulsating direct current from an alternating current supply line through electron discharge devices having control electrodes energized with alternating current at a frequency equal to twice the supply line frequency through a distributor of the single pole type; and Fig. 2 diagrammatically illustrates a further embodiment of the present invention differing from the embodiment illustrated in Fig. 1, in that several of the discharge devices are combined into a single device having control electrodes energized with pulsating current.

Referring more particularly to the drawings by characters of reference, reference numeral 6 designates an alternating current supply line herein illustrated as a single phase line. The motor illustrated in the present embodiment will, therefore, be of the single phase type, but it will be understood that the system herein illustrated may be made operable to control a polyphase alternating current motor energized from a polyphase supply line by suitable duplication of the elements shown and suitable modification of some of such elements as will be apparent to those skilled in the art. Line 6 energizes the primary winding 7 of a supply transformer having a secondary winding divided into two portions 9 and 10. Transformer 7, 9 and 10 supplies current to a motor 8 having an armature 11 connected in polygon and presenting a plurality of connection points such as 11a, 11b, etc. It will be assumed that the armature 11 is stationary, but it will be understood that such armature may be rotating, in which case the connections therewith would be effected over the usual slip rings. The motor is provided with a field winding 12 which is assumed to be rotating and connected over slip rings 13 and 14.

The connections between the winding portions 9 and 10 and the motor are effected over a plurality of electron discharge devices such as 16, 17, etc., equal in number to the connection points of winding 11. Such connection points are severally further connected with the anodes of a further plurality of electron discharge devices such as 72 having their cathodes connected with slip ring 13; and the slip ring 14 is connected with the common point of connection of the winding portions 9, 10. For the purpose of simplifying the drawings only such elements of the devices 16, 17, etc., and 72 as will be referred to in the description of the operation of the system have been designated by reference numerals and only the connections of such elements have been shown in their entirety. Each of the discharge devices 16, 17, etc., is provided with two anodes 21, 71 and with two control electrodes 26, 76 controlling the operation of such anodes. The cathodes 31 of devices 16, 17, etc., may be of any suitable type and are preferably of the incandescent type supplied with current from winding 9—10 through transformers 36, 37, etc. The discharge devices are preferably of the vapor type and therefore each contains a suitable vapor such as mercury vapor produced from a drop of mercury designated in device 16 at 41. Each of the discharge devices 72 is of a type similar to that of device 16 except that it is provided with only one anode 73 and one control electrode 75. The cathodes 74 of the several devices 72, connected with the slip ring 13, may be maintained at incandescence by means of a common transformer 78 energized from the winding portions 9—10.

The circuits controlling the application of potentials to the control electrodes 26, 76 and 75 whereby the conductivity of the respective valves 16, 17, etc., and 72 is controlled include reactors 56 and 57 and resistances 58 and 59 constituting a phase shifter circuit across which the primary winding of a phase shifter 61 is connected. The secondary winding 62 of the phase shifter 61 is mounted on the rotor thereof and the phase of the output voltage thereof depends on its adjusted position, which in the present embodiment may be effected manually by means of a lever 70. The winding 62 supplies current to an electron discharge device 79 provided with anodes and with a cathode 80 which may be maintained at incandescence by means of a transformer 82 energized from the winding portions 9—10. Winding 62 and device 79 constitute a rectifying system supplying current to the primary winding 84 of a transformer having a secondary winding 86, the magnitude of such current being adjusted by a rheostat 83. The current flowing through winding 84 and rheostat 83 is then a direct current pulsating at twice the frequency of the voltage of the supply line 6. It is understood that a direct current saturation of the core of transformer 84, 86 by the direct current component of the current in winding 84 may be avoided by any of the means known in the art. Winding 86 is connected with the brush 66 of a distributor 64 and energizes through one of the segments thereof, such as segment 64a, the primary winding 87 of a control transformer having a secondary winding 88 energizing control electrode 75 and another secondary winding 89 energizing control electrodes 26 and 76. A plurality of transformers similar to transformer 87, 88, 89 are provided for the control of the several control electrodes of the devices 16, 17, etc., and 72, the primary winding of each of such transformers being connected with winding 86 and with one of the segments of the distributor 64. Such energization permits the several control transformer primary windings, such as 87, to become sequentially energized from the winding 62 through the transformer 84, 86. In the present embodiment the position of the segments of the distributor 64 is shown as being adjustable by a solenoid 92, energized from a shunt 93 in the motor circuit to move distributor 64 against the action of a spring 91. In the present embodiment the motor will have a series characteristic as the flow of current occurs alternately from one terminal of the winding portions 9, 10 over one of the electron discharge devices 16, 17, through armature 11, through another electron discharge device 72, and through winding 12 to the center terminal of winding portions 9, 10.

In operation, considering the system at a moment during the period of positive energization of anode 21 with respect to cathode 31, winding 62 is so adjusted by means of lever 70 that, at such moment, winding 86 impresses on winding 88, by way of winding 87, a voltage causing control electrode 75 to be positively energized with respect to cathode 74, and causing control electrodes 26 and 76 to be positively energized with respect to cathode 31 from winding 89. Anodes 21 and 73 are thus made operable to carry current, such current flowing from winding portion 9 over anode 21, cathode 31, connection point 11a, armature winding 11, connection point 11b, anode 73, cathode 74, slip ring 13, field winding 12, slip ring 14 to the common point of winding portions 9 and 10. During the next half cycle of the voltage of line 6, anode 21 becomes negative with respect to cathode 31 and cannot carry current, and anode 71 then becomes positive with respect to cathode 31. During such period winding 87, which receives current at twice the frequency of the voltage of line 6, again causes control electrode 75 to become positive with respect to cathode 74 and control electrodes 26 and 76 to become positive with respect to cathode 31. Current then flows from winding portion 10 over anode 71, cathode 31, connection point 11a, armature winding 11, connection point 11b, anode 73, cathode 74, slip ring 13, field winding 12, slip ring 14, to the common point of winding portions 9 and 10. Such flow of current continues as long as brush 66 is in contact with commutator segment 64a, and may therefore extend over a period comprising a variable number of cycles of the voltage of the supply line 6, depending upon the speed of the motor. The flow of current in windings 11 and 12 produces a torque which causes rotation of the motor field and also causes brush 66 to leave segment 64a and to come in contact with another segment of the distributor. Such rotation of the brush 66 causes winding 86 to cease energizing control electrodes 26, 76 and 75, and devices 16 and 74 thereupon become inoperative. Winding 86 then energizes the control electrodes of another group of electron discharge devices, thereby permitting the flow of current through such devices and through armature winding 11 and field winding 12 in a manner similar to that described above, but over another pair of connection points of such armature winding. Such operation again impresses a torque on the motor field and causes continued rotation of the field in the same direction as at the first moment considered.

The above described process is repeated sequentially for each pair of connection points of winding 11 during each revolution of the motor to impart thereto a substantially uniform torque in a continuous direction. Depending on the speed of the motor, each pair of connection points is used during a variable number of successive cycles of the supply line voltage during each revolution of the field. The operation of the motor may be regulated by any means known in the art for the control of electron discharge devices. In the present embodiment the current taken by the motor may be manually adjusted to any desired value by movement of lever 70, such movement causing the control electrodes to be energized at a different moment of the voltage cycle of the supply line 6. The position of the distributor 64, which determines the position of the magnetic axis of winding 11 relative to that of field winding 12, is adjusted in dependence upon the motor current by solenoid 92, thereby imparting to the motor a characteristic which differs from the ordinary series characteristic of a motor not provided with such adjustment.

In the embodiment illustrated in Fig. 2, the electron discharge devices such as 72 in Fig. 1 are shown replaced by a unit device 94 provided with a cathode 96 energized from transformer 78. In the present embodiment, device 79 supplies current to a circuit including rheostat 83, another rheostat 97 and a reactor 98. The point of connection of rheostats 83 and 97 is connected with cathode 96 of device 94. The negative terminal of rheostat 83 is connected through resistances as at 99 with the segments of distributor 64 and with the control electrodes of device 94 over the primary windings, such as winding 101, of control transformers having secondary windings, as at 102. The secondary windings of the control transformers are connected with the negative terminal of rheostat 83 and energize the control electrodes of the devices as at 16, winding 102 being shown as energizing control electrodes 26 and 76 over resistances 51 and 81. Due to the connection of the circuits of device 79, the control electrodes of device 94 are generally maintained at a negative potential with respect to cathode 96 by the amount of the voltage drop in rheostat 83. Due to the insertion of reactor 98 into the circuit of rheostat 83, the current flowing therethrough is a substantially uniform direct current, and the voltage drop across rheostat 83 is a substantially uniform direct current voltage. The voltage impressed between cathode 96 and brush 66 of distributor 64 is an alternating voltage having for amplitude the value of the pulsation of the output voltage of device 79.

In operation, again considering the period during which anode 21 is positively energized with respect to cathode 31 and anode 73 positively energized with respect to cathode 96, control electrodes 26, 76 and 75 are negatively energized with respect to the associated cathodes 31 and 96 by the connection of such control electrodes with rheostat 83. Winding 62 of phase shifter 61 is so adjusted that, at a moment during the period of positive energization, control electrode 75 becomes positively energized with respect to cathode 96 over brush 66 and segment 64a of distributor 64. Control electrode 75 then acts as an anode and carries current which flows over winding 101. The flow of current in such winding causes a voltage impulse to be induced therein and in winding 102, such voltage impulse momentarily bringing control electrodes 26 and 76 to a positive potential with respect to cathode 31. Anodes 21 and 73 are then operable to carry current and current flows in the manner described with respect to the embodiment of Fig. 1. During the next half cycle of the voltage of line 6, anode 71 is positively energized with respect to cathode 31 and during such period control electrodes 75, 26 and 76 are again positively energized with respect to the associated cathodes. Current then flows through anodes 71 and 73 as already described with respect to the embodiment of Fig. 1.

In the present embodiment, the segments of distributor 64 are assumed to be manually adjustable by means of a lever 103 whereby the energization of the control electrodes of the device may be advanced or retarded with respect to the spatial position of field 12. The particular connection point of winding 11 through which current flows at any particular time may thus be selected with respect to the position of field winding 12, thereby adjusting the magnitude of the torque caused by the interaction of currents in the armature and in the field windings. If lever 103 is moved in a direction opposite to the direction of rotation of the motor, the torque will gradually decrease in value and reach zero when the distributor segments have been rotated by an angle of 90 electrical degrees. Further shifting of the distributor segments will cause the motor currents to produce a torque opposite to the torque previously produced, thereby causing reversal of the direction of rotation of the motor without using switching devices and without necessitating the expenditure of electrical energy in resistances. It will be understood that such manual reversal of the direction of rotation may also be provided when the segments of the distributor are continuously adjusted by automatic means such as solenoid 92 illustrated in Fig. 1.

This application is a division of application Serial No. 655,015, filed February 3, 1933, patented Oct. 10, 1939, No. 2,175,547; and although but two embodiments of the present invention have been illustrated and described herein, it will be apparent to those skilled in the art that various changes and modifications may be made therein without departing from the spirit of the invention or from the scope of the appended claims.

It is claimed and desired to secure by Letters Patent:

1. In a control system for electric motors, an alternating current supply line, an electric motor, electric valves of the electron discharge type connected with said line and with said motor to control operation thereof, said valves having anodes with associated control electrodes and each having a cathode, the control electrodes controlling flow of current through said valves and being connected for energization from said line, a distributor operated by the shaft of said motor and controlling the energization of the control electrodes and thereby controlling operation of said motor, and means operable responsive to and in dependence upon flow of current through said motor for automatically varying the adjustment of said distributor.

2. In a control system for electric motors, an alternating current supply line, an electric motor, electric valves of the electron discharge type connected with said line and with said motor to control operation thereof, said valves having anodes with associated control electrodes and a cathode, the control electrodes controlling flow of current through said valves and being connected for energization from said line, a distributor operated by the shaft of said motor and controlling the energization of the control electrodes and thereby controlling operation of said motor, and a solenoid connected with one winding of said motor to vary the operation of said distributor in response to the flow of current through said motor.

3. In a control system for electric motors, an alternating current supply line, an electric motor, electric valves of the electron discharge vapor filled type connecting said line with said motor to control the flow of current therethrough, said valves having electrodes to control the flow of current therethrough, transformers connected with the cathode and with the control electrode of each of said valves, manually adjustable means connecting said transformers with said line to vary the potential supplied therefrom relative to the potential of said line, and manually adjustable means operated by said motor and controlling the connection of the first said means with the control electrodes.

4. In a control system for electric motors, a supply line, an electric motor, means comprising a plurality of electric valves of the electron discharge type each having an anode and a cathode interconnecting said line with said motor operable to control the supply of operating current to the latter, each of said valves being provided with a control electrode, and a manually adjustable distributor switch operated by said motor for connecting said line with each of said control electrodes to thereby impress thereon potential supplied from said line and differing from the potential of the associated cathode to control the said operation of said valves to start said motor, to control the speed of operation thereof, and to reverse the direction of operation thereof.

5. The combination with an alternating current supply circuit, a load circuit, and electric valve means comprising a cathode and an anode interconnecting said circuits and constituting spaced electrodes for the flow of energy therebetween, of means for causing said anode to conduct two impulses of energy during a cycle of the voltage of said supply circuit comprising a control electrode associated with said anode, and means for producing and impressing on said control electrode a potential having a frequency equal to twice the frequency of the voltage of the said supply circuit.

6. The combination with an alternating current supply circuit, a load circuit, and electric valve means comprising a cathode and an anode interconnecting said circuits and constituting spaced electrodes for the flow of energy therebetween, of means for causing said anode to conduct a predetermined plurality of impulses of current during a cycle of the voltage of said supply circuit comprising a control electrode associated with said anode, and means for producing and impressing on said control electrode a predetermined plurality of impulses of potential during each cycle of the voltage of said supply circuit.

7. The combination with an alternating current supply circuit, a load circuit, and electric valve means comprising a cathode and an anode interconnecting said circuits and constituting spaced electrodes for the flow of energy therebetween, of means for causing said anode to conduct two impulses of energy during a cycle of the voltage of said supply circuit comprising a control electrode associated with said anode, means for producing and impressing on said control electrode a potential having a frequency equal to twice the frequency of the potential of said supply circuit, and means for varying the moments of impression of the said potential on said control electrode relative to the voltage cycle of said supply circuit.

8. The combination with an alternating current supply circuit, a load circuit, and electric valve means comprising a cathode and an anode interconnecting said circuits and constituting spaced electrodes for the flow of energy therebetween, of means for causing said anode to conduct two impulses of energy during a cycle of the voltage of said supply circuit comprising a control electrode associated with said anode, and means comprising an auxiliary electric valve for producing and impressing on said control electrode potential having a frequency equal to twice the voltage frequency of said supply circuit.

9. The combination with an alternating current supply circuit, a load circuit, and electric valve means comprising a cathode and an anode interconnecting said circuits and constituting spaced electrodes for the flow of energy therebetween, of means for causing said anode to conduct two impulses of energy during a cycle of the voltage of said supply circuit comprising a control electrode associated with said anode, and means comprising an auxiliary electric valve for producing and impressing on said control electrode impulses of potential at two predetermined moments during each cycle of the voltage of said supply circuit.

10. The combination with an alternating current supply circuit, a load circuit, and electric valve means comprising a cathode and an anode interconnecting said circuits and constituting spaced electrodes for the flow of energy therebetween, of means for causing said anode to conduct a plurality of impulses of energy during a cycle of the voltage of said supply circuit comprising a control electrode associated with said anode, and means for producing and impressing on said control electrode a predetermined plurality of impulses of potential at predetermined moments during each cycle of the voltage of said supply circuit.

11. The combination with an alternating current supply circuit, a load circuit, and electric valve means comprising a cathode and an anode interconnecting said circuits and constituting spaced electrodes for the flow of energy therebetween, of means for controlling said flow of energy comprising a control electrode associated with said anode, means for producing and impressing on said control electrode a plurality of impulses of potential at predetermined moments during each cycle of the voltage of said supply circuit, and means operable in dependence upon an operating condition of said load circuit for varying the said moments of the impression of said potential on said control electrode.

12. In an electric power translating system, the combination with a source of alternating current, an electric motor, and electric valve means comprising a cathode and a plurality of anodes interconnecting said source with said motor and constituting spaced electrodes for the flow of energy therebetween, a plurality of control electrode severally associated with said anodes, of means for causing a selected one of said anodes to conduct two impulses of energy during a cycle of the voltage of said source of current comprising means having connection with said source of current and operable to transform the potential thereof to a potential having a frequency equal to twice the frequency of said source, and means for impressing the said potential of twice the frequency of said source sequentially on said control electrodes.

13. In an electric translating system, the combination with a source of alternating current, an electric motor, and electric valve means comprising a cathode and a plurality of anodes interconnecting said source with said motor and constituting spaced electrodes for the flow of energy therebetween, a plurality of control electrodes severally associated with said anodes, of means for causing a selected one of said anodes to conduct two impulses of energy during a cycle of the voltage of said source of current comprising an auxiliary electric valve having connection with said source and operable to produce therefrom potential having a frequency equal to twice the frequency of said source, and means comprising means operable responsive to and in dependence on the speed of rotation of said motor for continually impressing the said potential of twice the frequency of said source sequentially on said control electrodes at predetermined moments relative to the voltage cycle of said source.

14. In an electric translating system, the combination with a source of alternating current, an electric motor, and electric valve means comprising a cathode and a plurality of anodes interconnecting said source and constituting spaced electrodes for the flow of energy therebetween, a plurality of control electrodes severally associated with said anodes, of means for causing a selected one of said anodes to conduct two impulses of energy during a cycle of the voltage of said source of current comprising an auxiliary electric valve having connection with said source and operable to produce therefrom potential having a frequency equal to twice the frequency of said source, means comprising means operable responsive to and in dependence on the speed of rotation of said motor for continually impressing the said potential of twice the frequency of said source sequentially on said control electrodes at predetermined moments relative to the voltage cycle of said source, and means for varying the said predetermined moments of impression of said potential of twice the frequency of said source on said control electrodes.

15. The combination with an alternating current supply circuit, a load circuit, and electric valve means comprising a cathode and an anode interconnecting said circuits and constituting spaced electrodes for the flow of energy therebetween, of means for controlling the said flow of energy comprising a control electrode associated with said anode, means comprising an auxiliary electric valve having connection with said supply circuit and operable to produce therefrom potential of unidirection, means for impressing said potential of unidirection on said control electrode to prevent initiation of said flow of energy, means for converting said potential of unidirection to alternating potential having a frequency equal to twice the frequency of the voltage of said supply circuit, and means for continually impressing the said alternating potential on said control electrode during such moments relative to the voltage cycle of said supply circuit as to render the said valve means operable for the said flow of energy.

16. The combination with an alternating current supply circuit, a load circuit, and electric valve means comprising a cathode and an anode interconnecting said circuits and constituting spaced electrodes for the flow of energy therebetween, of means for controlling said flow of energy comprising a control electrode associated with said anode, means comprising an auxiliary electric valve having connection with said supply circuit operable to produce therefrom impulses of potential of unidirection having a frequency equal to twice the frequency of the voltage of said supply circuit, means for deriving from said impulses and for impressing on said control electrode a potential of substantially constant magnitude to prevent initiation of said flow of energy, and means for continually impressing said impulses of potential on said control electrode at such moments relative to the voltage cycle of said supply circuit as to render said valve means operable for the said flow of energy.

17. The combination with an alternating current supply circuit, a load circuit, and electric valve means comprising a cathode and an anode interconnecting said circuits and constituting spaced electrodes for the flow of energy therebetween, of means for controlling said flow of energy comprising a control electrode associated with said anode, means comprising an auxiliary electric valve having connection with said supply circuit and operable to produce therefrom potential of unidirection, means for impressing said potential of unidirection on said control electrode to prevent initiation of said flow of energy, means for converting said potential of unidirection to alternating potential having a frequency equal to twice the frequency of the voltage of said supply circuit, means for continually impressing the said alternating potential on said control electrode at such moments relative to the voltage cycle of said supply circuit as to render the said valve means operable for the said flow of energy, and means for varying the moments of continual impression of the said potential on the said control electrode relative to the voltage cycle of said supply circuit.

18. The combination with an alternating current supply circuit, a load circuit, and electric valve means interconnecting said circuits comprising one group of arc paths for transmitting curent to said load circuit and a second group of arc paths for returning said current from said load circuit, of means for rendering simultaneously conductive one arc path in each of said groups and subsequently rendering simultaneously conductive the said one arc path in one of said groups and a different arc path in the other of said groups during each cycle of the voltage of said supply circuit.

19. The combination with an alternating current supply circuit, a load circuit, and electric valve means interconnecting said circuits comprising one group of arc paths for transmitting current to said load circuit and a second group of arc paths for returning said current from said load circuit, of means for rendering simultaneously conductive one arc path in the said one group of arc paths and another arc path in said second group of arc paths and subsequently rendering simultaneouly conductive said another arc path in the said second group and a different arc path in said one group during each cycle of the voltage of said supply circuit.

20. In combination, an alternating current supply circuit, a load circuit, electric valve means of the gaseous type for interconnecting said circuits and including a plurality of arc paths each having a control member associated therewith and means for selectively energizing said control members to render predetermined arc paths of said arc paths simultaneously conductive at a number of predetermined different intervals during each cycle of potential of said alternating current circuit.

21. In combination, an alternating current circuit, a load circuit, electric valve translating apparatus for interconnecting said circuits and including a plurality of arc paths each having a control member associated therewith, means for impressing potentials on said control members to render predetermined arc paths of said arc paths simultaneously conductive at a number of predetermined different intervals during each cycle of potential of said alternating current circuit, and means for controlling the phase of said potentials.

DIDIER JOURNEAUX.